(12) United States Patent
Zreyas et al.

(10) Patent No.: US 11,044,921 B2
(45) Date of Patent: Jun. 29, 2021

(54) NATURAL DAIRY BASED CREAMERS AND METHOD OF MAKING THE SAME

(71) Applicant: SOCIETE DES PRODUITS NESTLE S.A., Vevey (CH)

(72) Inventors: Veena Zreyas, Plain City, OH (US);
Maxime Saffon, Hilliard, OH (US);
Deepak Sahai, Plain City, OH (US);
Alexander A. Sher, Dublin, OH (US)

(73) Assignee: Societe des Produits Nestle S.A., Vevey (CH)

( * ) Notice: Subject to any disclaimer, the term of this patent is extended or adjusted under 35 U.S.C. 154(b) by 0 days.

(21) Appl. No.: 16/496,543

(22) PCT Filed: Mar. 15, 2018

(86) PCT No.: PCT/EP2018/056481
§ 371 (c)(1),
(2) Date: Sep. 23, 2019

(87) PCT Pub. No.: WO2018/172170
PCT Pub. Date: Sep. 27, 2018

(65) Prior Publication Data
US 2020/0375206 A1    Dec. 3, 2020

Related U.S. Application Data

(60) Provisional application No. 62/475,992, filed on Mar. 24, 2017.

(51) Int. Cl.
*A23C 11/04* (2006.01)
*A23C 9/154* (2006.01)
(Continued)

(52) U.S. Cl.
CPC ............. *A23C 11/04* (2013.01); *A23C 9/156* (2013.01); *A23C 9/1544* (2013.01); *A23C 13/14* (2013.01); *A23C 17/00* (2013.01)

(58) Field of Classification Search
CPC ....... A23C 11/04; A23C 9/1544; A23C 9/156; A23C 13/14; A23C 17/00
(Continued)

(56) References Cited

U.S. PATENT DOCUMENTS

2005/0266138 A1    12/2005    Yuan et al.
2012/0288611 A1    11/2012    Sher et al.
(Continued)

FOREIGN PATENT DOCUMENTS

WO    WO-2010093864 A2 *  8/2010    ............ A23L 19/09
WO    2012146777          11/2012
(Continued)

*Primary Examiner* — Brent T O'Hern
(74) *Attorney, Agent, or Firm* — K&L Gates LLP

(57) ABSTRACT

Natural premium dairy based creamers for providing whitening and indulgent texture/mouthfeel of beverage and food products are provided. The creamers have good stability for 4 months at refrigeration, high whitening capacity and a pleasant mouthfeel when added to beverage or food, while being free from artificial additives. In a general embodiment, the present disclosure provides a creamer free of any artificial additives and comprising added sugar, milk fat, optionally vegetable oil, milk proteins including sweet buttermilk powder, gellan gum and optionally guar gum, and optionally natural flavors.

12 Claims, 1 Drawing Sheet

(51) Int. Cl.
    *A23C 9/156*     (2006.01)
    *A23C 13/14*     (2006.01)
    *A23C 17/00*     (2006.01)

(58) Field of Classification Search
    USPC .......................................................... 426/585
    See application file for complete search history.

(56) References Cited

U.S. PATENT DOCUMENTS

2013/0122178 A1*   5/2013   Sher ........................ A23C 11/08
                                                                426/602
2017/0020154 A1*   1/2017   Fu .......................... A23C 11/00

FOREIGN PATENT DOCUMENTS

| WO | WO-2012146777 A1 * | 11/2012 | ............... A23L 9/20 |
|----|--------------------|---------|---------------------------|
| WO | 2013092693         | 6/2013  |                           |
| WO | 2016196708         | 12/2016 |                           |
| WO | 2017001392         | 1/2017  |                           |

* cited by examiner

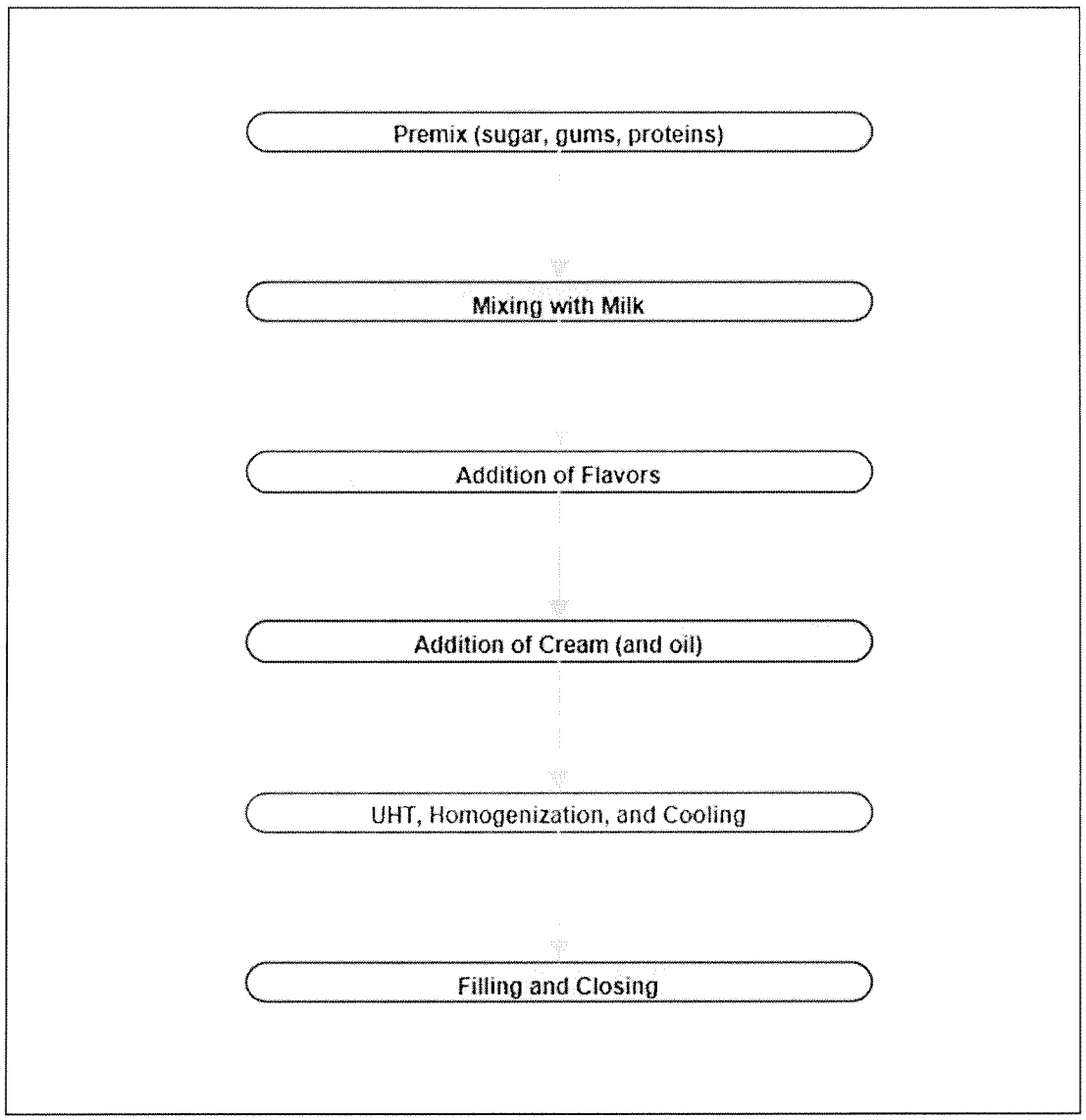

NATURAL DAIRY BASED CREAMERS AND METHOD OF MAKING THE SAME

CROSS REFERENCE TO RELATED APPLICATIONS

The present application is a National Stage of International Application No. PCT/EP2018/056481, filed on Mar. 15, 2018, which claims priority to U.S. Provisional Patent Application No. 62/475,992, filed on Mar. 24, 2017, the entire contents of which are being incorporated herein by reference.

BACKGROUND

The present disclosure generally relates to food products. More specifically, the present disclosure relates to natural dairy based creamers for food products such as coffee and tea.

Creamers are widely used as whitening agents, also as the texture/mouthfeel modifier with hot and cold beverages, e.g., coffee, cocoa, tea, etc. They are commonly used in place of milk and/or dairy cream. Creamers may come in a variety of different flavors and provide a whitening effect, mouthfeel, body, and a smoother texture.

Creamers can be in liquid or powder forms. One disadvantage of powder forms is that they do not generally provide an impression of traditional dairy based creamers. Another disadvantage of using powder creamers may include difficulties in dissolution when added to coffee, and also the possibility of having a non-homogeneous beverage.

More and more consumers are concerned by the synthetic or artificial additives in food products. Thus, there is a demand for commercially available natural dairy based creamers.

There is a need for natural dairy based liquid creamers having long-term (up to 4 months) shelf stability, excellent whitening and sensorial properties. The creamers should also have indulgent appearance when pouring into coffee or tea. Also, the natural creamers should be free-flowing, and homogeneous. The challenge is to provide good texture/mouthfeel without physical instability issues using only clean label ingredients and at high level of fat and/or oil during entire product shelf life. Thus, the fat emulsion should be stable and free of aggregates or clumps during its shelf life. It should also provide good sensorial properties without any physical instability when added to beverages.

SUMMARY OF THE INVENTION

The present disclosure relates to natural dairy high fat creamers for food products and methods of making the creamers. The creamers can be stored at refrigerated temperatures and be stable for extended periods of time (up to 4 months). The creamers have high whitening capacity and a pleasant mouthfeel while masking the bitterness and astringency of a beverage. In a general embodiment, the present disclosure provides a natural liquid dairy based creamer free of additives, comprising added sugar, milk fat, milk proteins, wherein said creamer further comprises high-acyl gellan gum, and sweet buttermilk powder,
  wherein high-acyl gellan gum ranges from 0.03 to 0.075 wt/wt %;
  wherein sweet buttermilk powder ranges from 0.1 to 3.0 wt/wt %;
  wherein the protein content ranges from 2.5 to 5.5 wt/wt %;
  wherein the fat content ranges from 11 to 18 wt/wt %;
  wherein viscosity of the final product is between 100 and 500 cP measured at 4° C. and shear rate of 75 sec$^{-1}$; and
  wherein the total solids ranges from 45 to 65 wt/wt %.

In an embodiment of the present invention, milk proteins are protein sources comprising liquid milk, cream, heavy cream, condensed milk, evaporated milk, liquid skim milk, liquid whole milk, non-fat dry milk powder, whole milk powder, whey protein isolate powder, whey protein concentrate powder, milk protein concentrate powder, micellar casein powder, buttermilk powder and/or combinations thereof.

In an embodiment of the present invention, buttermilk is sweet buttermilk powder In an embodiment of the present invention, the milk fat is a fat source comprising heavy cream, liquid whole milk, partially skimmed liquid milk, whole milk powder, milk fat, anhydrous milk fat, sweet buttermilk powder and/or combinations thereof.

In an embodiment of the present invention, the creamer further comprises vegetable oil from selected from the group consisting of high oleic canola, high oleic soybean oil, high oleic sunflower, high oleic safflower, coconut oil or a combination thereof.

In an embodiment of the present invention, the creamer further comprises coconut oil in an amount ranging from 0 to 15 wt/wt %.

In an embodiment of the present invention, the total phospholipids content is at least 0.1 mg/g of total solids of the product.

In an embodiment of the present invention, the creamer further comprises guar gum in an amount ranging from 0 to 0.25 wt/wt %.

In an embodiment of the present invention, the sugar source comprises cane sugar, beet sugar, molasses, honey and/or combinations thereof.

In an embodiment of the present invention, the natural sweeteners source which is also a form of sugar source comprises Luo Han Guo (monk fruit) extract, stevia, rebaudiosides, and/or combinations thereof.

In an embodiment of the present invention, the creamer comprises natural flavors.

In an embodiment of the present invention, the natural flavors comprise cocoa, Belgian chocolate, dark chocolate, Tahitian vanilla, Himalayan salt, caramel and/or combinations thereof.

In an embodiment of the present invention, the creamer is free of artificial or chemically modified stabilizers, emulsifiers, buffers, additional whitening agents, anti-foaming agents, chelators, surfactants or any other artificial ingredients.

In another embodiment of the present invention, a process for manufacturing creamer comprises the steps of:
  Obtaining ingredients including milk fat kept under low agitation at alternative process conditions to avoid foam generation;
  Preparing a premix comprising gums, milk proteins, and sugar;
  Mixing of the premix in presence of nonfat dry milk powder to achieve a
  completed hydration of dry ingredients and optionally add flavor;
  Mixing of fat components under low shear;
  UHT treatment;
  Homogenization at 135/35 bars;
  Filing the container aseptically.

In an embodiment of the present invention, the UHT treatment temperature is at a minimum 141° C. for about 3 seconds or any other suitable combinations.

In an embodiment of the present invention, the process further comprises homogenizing and aseptically processing the creamer.

Embodiments of the present disclosure provide a natural, dairy-based, liquid creamer that does not contain any artificial or chemically modified stabilizers, emulsifiers, buffers or whitening agents, and exhibits stability up to 4 months at refrigeration temperatures (e.g. 4° C.) and provides good whitening and sensorial effects in beverages, such as coffee.

An advantage of the present disclosure is to provide a natural dairy based liquid creamer having a high whitening capacity, good sensory properties and physical stability during storage without using artificial ingredients.

Yet another advantage of the present disclosure is to provide a long-term, stable creamer having excellent whitening effect that is stable for at least 4 months at a temperature of about 4° C.-8° C.

Yet another advantage of the present disclosure is to provide a long-term, stable creamer having excellent homogeneity. That is without any phase separation, clogs, clumps or gelling.

Yet another advantage of the present disclosure is to provide dairy based liquid creamer with good visual appearance during pouring in coffee or tea.

Another advantage of the present disclosure is to provide a liquid creamer that has a good mouthfeel, body, smooth texture, and a good flavor without off-notes.

Additional features and advantages are described herein, and will be apparent from, the following Detailed Description and the figures.

BRIEF DESCRIPTION OF THE FIGURES

FIG. 1 shows the process is demonstrated by process diagram.

DETAILED DESCRIPTION

The present disclosure relates to natural dairy based high fat creamers and methods of making the creamers. The creamers can be in a liquid form and added to any suitable beverage in an amount sufficient to provide whitening, creaming, indulgent mouthfeel, as well as preferred sensorial effects in the beverage. The creamer has premium visual appearance, including when pouring in coffee or other beverages, soups and other food products. A creaming effect imparts qualities associated with cream or dairy such as desirable flavor, texture, body, and/or color (e.g., lightening or whitening). In these embodiments, creamer is natural, dairy-based, and has good physico-chemical stability during shelf life. The creamer is made by the combination of milk (skim or whole, raw or pasteurized), heavy cream, sweet buttermilk, sugar (as well as natural sweeteners) and a natural flavor. Additionally, the creamer may contain vegetable oil such as coconut oil. It also comprises high acyl gellan gum and may comprise guar gum. The fat, protein, sugar and the gellan gum in the creamer come from natural sources. The creamer possesses a refrigerated stability without developing unfavorable phenomena such as aggregation, separation, gelling, clogging or clumping in itself, or feathering, oil off, aggregation or cream separation, for example, after addition to a hot beverage such as coffee or tea.

In one embodiment, the present disclosure provides buttermilk powder which is the sweet buttermilk powder obtained after churning cream and/or salted cream to butter and spray dried into powder.

As used herein, the term "stable" means remaining in a state or condition having no phase separation (e.g., creaming, sedimentation, and/or age gelation) or spoilage or bitterness (e.g., due to storage) for an extended period of time (e.g., for at least 4 months) at refrigerated conditions (e.g., about 4-8° C.).

The term "free of additives" relates to free of artificial or chemically modified stabilizers, emulsifiers, buffers, additional whitening agents, anti-foaming agents, chelators, surfactants or any other artificial ingredients.

In a general embodiment, the present disclosure provides a creamer free of additives comprising sugar, milk fat, milk proteins and optionally natural flavor, wherein the milk phospholipids are more than 0.1 mg/g total solid of product.

The creamers in embodiments of the present disclosure differ from conventional dairy based creamers that contain artificial and/or chemically modified additives such as hydrocolloids (e.g., hydroxypropyl cellulose, carboxymethyl cellulose, modified starches, methyl cellulose), anti-foaming agents, surfactants, added emulsifiers (e.g., monoglycerides, succinic acid esters of monoglycerides, diacetyl tartaric acid esters of monoglycerides, etc.), buffers (e.g., monophosphates, diphosphates, sodium mono- and bicarbonates, potassium mono- and bicarbonates, etc.) and whitening agents (e.g., titanium dioxide, etc.) that are usually used to achieve the desired shelf-life stability and performance (e.g., whitening properties) of dairy or non-dairy based creamers. Although the creamers in embodiments of the present disclosure do not contain any artificial or chemically modified additives (e.g., hydrocolloids, thickeners, stabilizers), the creamers are able to exhibit similar or superior texture, sensorial properties and stability or whitening power than respective conventional dairy based creamers containing artificial additives.

It has been unexpectedly found that total milk phospholipids content in the product (more than 0.1 mg/g) have a tremendous impact on products physical stability during storage.

In any embodiments of the creamer of the present disclosure, the sugar (e.g., sucrose, monosaccharides, disaccharides, polysaccharides, etc.) can be from any suitable sugar source. Non-limiting examples of the sugar source include beets, canes, condensed milk, honey, molasses, agave syrup, maple syrup, malt, sugar cane juice, yacon syrup or a combination thereof. Non-limiting examples of the natural sweeteners source include Lou Han Gou (monk fruit) extract, stevia, rebaudiosides, etc. In any embodiments of the creamer of the present disclosure, the amount of added sugar in the creamer can range between about 20% and about 45% by mass.

In any embodiments of the creamer of the present disclosure, the protein can be from a protein source such as liquid cow milk, heavy cream, sweet buttermilk, condensed milk, evaporated milk, whey protein isolate, whey protein concentrate, whole milk powder, nonfat dry milk powder, milk protein concentrate powder, micellar casein powder or a combination thereof. In any embodiments of the creamer of the present disclosure, the amount of protein present in the creamer can range between about 2.5% and about 5.5% by mass. More specifically, the protein can be about 2.5%, 3%, 3.5%, 4%, 4.5%, 5%, 5.5% by mass. It should be appreciated that any two amounts of the protein recited herein can further represent end points in a preferred range of the protein. For example, the amounts of 2.5% and 3% by mass can represent the individual amounts of the protein in the creamer as well as a preferred range of the protein in the creamer ranging between about 2.5% and about 5.5% by mass.

In any embodiments of the creamer of the present disclosure, the milk fat can be from a fat source including at least one of sweet or salty buttermilk, heavy cream, liquid whole milk, partially defatted liquid milk, whole milk powder, anhydrous milk fat or a combination thereof. In any embodiments of the creamer of the present disclosure, the amount of fat in the product can range between about 11% and about 18% by mass. More specifically, the fat can be about 11%, 12%, 13%, 14%, 15%, 16%. 17%, 18%, by mass and the like.

In any embodiments of the creamer of the present disclosure, the fat can be from a vegetable oil source selected from the group consisting of high oleic canola, high oleic soybean oil, high oleic sunflower, high oleic safflower, coconut oil or a combination thereof.

In any embodiments of the creamer of the present disclosure, the creamer further comprises coconut oil in an amount ranging from 0 to 15 wt/wt %.

It should be appreciated that any two amounts of the fat recited herein can further represent end points in a preferred range of the fat. For example, the amounts of 12% and 5% by mass can represent the individual amounts of the fat in the creamer as well as a preferred range of the fat in the creamer ranging between about 12% and about 17% by mass.

The creamers in embodiments of the present disclosure can further include any other suitable ingredients such as natural flavors and/or natural sweeteners. Flavors can be, for example, chocolate, cocoa, hazelnut, caramel, vanilla, etc. Sweeteners can be, for example, stevia, Luo Han Guo (monk fruit) extract, stevia, rebaudiosides, and/or combinations thereof. Usage level of the flavors, sweeteners and colorants will vary greatly and will depend on such factors as the level and type of flavors, sweeteners and colors used and cost considerations.

In any embodiments of the creamer of the present disclosure, the natural flavours comprises cocoa, Belgian chocolate, dark chocolate, Tahitian vanilla, Himalayan salt, caramel and/or combinations thereof.

The creamer alternative embodiments of the present disclosure can be stored at refrigerated temperatures not causing unfavorable phenomena such as aggregation, separation, gelling, clogging or clumping in itself or in the finished beverages when the creamer is added to coffee/tea.

The creamers in alternative embodiments of the present disclosure can be easily dispersible in coffee and stable in hot and cold acidic environments without one or more of the following problems: feathering, breaking emulsion, de-oiling, flocculation and sedimentation. When added to coffee, tea, cocoa or other liquid products, the creamers can provide a high whitening capacity, a good mouthfeel, full body, smooth texture, and also a good flavor with no off-flavor notes that could be developed during storage time. The creamers can be used with other various food products such as cereals, as cream for berries, creamers for soups or in many cooking applications.

In an embodiment of the method, the dairy source having the fat and the dairy source having the protein are in a pasteurized, raw or a combination of both the forms. The dairy source having the fat, the dairy source having the protein and the dairy source having the phospholipids can be the same dairy source or each be from one or more different dairy sources. In an embodiment of this method, the dairy based creamer does not include any artificial or chemically modified hydrocolloids, emulsifiers, buffers or added whitening agents.

As an example of the method according to an embodiment of the present disclosure, a dairy based creamer can be prepared by mixing cream, milk ingredient including for example liquid skim or whole milk, nonfat dry milk and sweet buttermilk powder, high acyl gellan gum and sugar. The mixture can be sterilized by steam injection or infusion, for example, at about 141° C. for about 3 seconds or any other suitable heat treatment.

In any embodiments of the methods described herein, during processing and production of the creamer, the mixing of any components of the creamers such as proteins/dairy product, vegetable fat and/or dairy product, high acyl gellan gum, optionally guar gum, sugar(s), flavor(s), etc., in liquid can be done under agitation, with or followed by heat treatment, homogenization, cooling and filling aseptic containers under aseptic conditions. Aseptic heat treatment may use direct or indirect ultra-high temperature ("UHT") steam injection or steam infusion processes. UHT processes are known in the art. Examples of UHT processes include UHT sterilization and UHT pasteurization.

In any embodiments of the methods described herein, during processing and production of the creamer, the mixing of any components of the creamers such as proteins/dairy product, vegetable fat and/or dairy product, high acyl gellan gum, optionally guar gum, sugar(s), flavor(s), etc., in liquid can be done under agitation, with or followed by heat treatment, homogenization, cooling and filling aseptic containers under aseptic conditions Direct heat treatment can be performed by injecting steam in the mix. In this case, it may be necessary to remove excess water, by flashing. Indirect heat treatment can be performed with a heat transfer interface in contact with the mix. The homogenization could be performed before and/or after the heat treatment. It may be interesting to perform homogenization before heat treatment in order to improve heat transfers in the mix, and thus achieve an improved heat treatment. Performing a homogenization after heat treatment usually ensures that the oil droplets in the emulsion have the desired dimension. Aseptic filling is described in various publications, such as articles by L. Grimm in "Beverage Aseptic Cold Filling" (Fruit Processing, July 1998, p. 262-265), by R. Nicolas in "Aseptic Filling of UHT Dairy Products in HDPE Bottles" (Food Tech. Europe, March/April 1995, p. 52-58) or in U.S. Pat. No. 6,536,188 B1 to Taggart, which are incorporated herein by reference.

It was surprisingly found that the liquid creamer has good appearance, mouth-feel, smooth texture and a good flavour without "off" taste. In addition, the creamer showed enhanced pourability and high whitening capacity when added to a coffee

EXAMPLES

By way of example and not limitation, the following examples are illustrative of various embodiments of the present disclosure.

Example 1

Dairy-based high fat liquid creamers were produced as below. The process is demonstrated by process diagram (FIG. 1).

A dry blend of sugar, high acyl gellan gum, guar gum, nonfat dry milk, sweet buttermilk powder, salt, natural flavors was prepared by mixing together 25 kg of sucrose with 4 kg of nonfat dry milk, 1 kg of sweet buttermilk powder, 50 g of high acyl gellan, 100 g of guar gum, 10 g of salt, 500 g of natural flavors. The dry blend was added into 25 kg of liquid milk agitation.

Next, under continuous high agitation, 40 kg of cream was added into the tank under agitation for 5 minutes. Additional fluid milk was used to adjust the total amount to 100 kg.

The liquid creamer was UHT treated for 3 sec at 141° C., homogenized at 135/35 bar and cooled. The liquid creamer was then aseptically filled into bottles. The resultant liquid creamer can be aseptically filled in any aseptic containers such as, for example, jars, jugs or pouches. The liquid creamer was stored 4 month at 4° C.

The physico-chemical stability and sensory of creamer and coffee beverages with added liquid creamer were judged by trained panelists. No phase separation (creaming, de-oiling, marbling, etc.), gelation were found during the storage.

Example 2

A liquid creamer was prepared as in Example 1 but using 10 kg of coconut oil, 16 kg of cream, 6 kg of on nonfat dry milk, and 80 g of high acyl gellan gum, and without guar gum.

The physico-chemical stability and sensory of creamer and coffee beverages with added liquid creamer were judged by trained panelists. No phase separation (creaming, de-oiling, marbling, etc.), gelation were found during the storage.

Example 3

A liquid creamer was prepared as in Example 1 but using 70 g of high acyl gellan gum, 1.5 kg sweet buttermilk powder, and without guar gum.

The physico-chemical stability and sensory of the creamer and coffee beverages with added liquid creamer were judged by trained panelists. No phase separation (creaming, de-oiling, marbling, etc.), gelation were found during the storage.

Example 4

A liquid creamer was prepared as in Example 2 but using 20 g of high acyl gellan gum.

The physico-chemical stability and sensory of liquid creamer and coffee beverages with added liquid creamer were judged by trained panelists. The viscosity of the product was too low resulting in poor pouring performances and non-expectable mouthfeel in coffee. The creamer also exhibited creaming after 1 month storage at refrigeration.

Example 5

A liquid creamer was prepared as in Example 1 but using 6 kg nonfat dry milk, 80 g of high acyl gellan gum, and without guar gum.

The physico-chemical stability and sensory of creamer and coffee beverages with added liquid creamer were judged by trained panelists. No phase separation (creaming, de-oiling, marbling, etc.), gelation were found during the storage.

Example 6

A liquid creamer was prepared as in Example 1 but without using nonfat dry milk, sweet buttermilk powder, and gums.

The physico-chemical stability and sensory of liquid creamer and coffee beverages with added liquid creamer were judged by trained panelists. The viscosity of the product was low resulting in undesirable visual appearance during pouring and watery mouthfeel in coffee. The creamer also exhibited creaming.

Example 7

A liquid creamer was prepared as in Example 2 but using 3 kg milk protein concentrate, and without sweet buttermilk powder amounting to 6 wt/wt % of milk proteins.

The physico-chemical stability and sensory of liquid creamer and coffee beverages with added liquid creamer were judged by trained panelists. After 1-months storage at 4° C., the sensory evaluation showed gelation in the bottle and undesirable mouthfeel (chalky texture) in coffee. There was also cream plug formation after 1 month at refrigeration.

The invention claimed is:

1. A liquid dairy based creamer free of artificial additives and chemically modified additives, the liquid dairy based creamer comprising milk fat, milk proteins, high-acyl gellan gum, sweet buttermilk, added sugar, and a vegetable oil selected from the group consisting of high oleic canola oil, high oleic soybean oil, high oleic sunflower oil, high oleic safflower oil, coconut oil and combinations thereof, and wherein:
the high-acyl gellan gum ranges from 0.03 to 0.075 wt/wt %;
the sweet buttermilk ranges from 0.1 to 3.0 wt/wt %;
the total protein content ranges from 2.5 to 5.5 wt/wt %;
the total fat content ranges from 11 to 18 wt/wt %;
a viscosity of the liquid dairy based creamer is between 100 and 500 cP measured at 4° C. and shear rate of 75 $\sec^{-1}$;
a total solids ranges from 45 to 65 wt/wt %; and
a total phospholipids content is at least 0.1 mg/g of the total solids of the liquid dairy based creamer.

2. The liquid dairy based creamer of claim 1, wherein the liquid dairy based creamer comprises a protein source which comprises the milk proteins, the protein source selected from the group consisting of liquid milk, cream, heavy cream, condensed milk, evaporated milk, liquid skim milk, liquid whole milk, non-fat dry milk powder, whole milk powder, whey protein isolate powder, whey protein concentrate powder, milk protein concentrate powder, micellar casein powder, buttermilk and combinations thereof.

3. The liquid dairy based creamer of claim 1, wherein the liquid dairy based creamer comprises a fat source which comprises the milk fat, the fat source selected from the group consisting of heavy cream, liquid whole milk, partially skimmed liquid milk, whole milk powder, milk fat, anhydrous milk fat, sweet buttermilk and combinations thereof.

4. The liquid dairy based creamer of claim 1, wherein the vegetable oil comprises coconut oil in an amount ranging from 0 to 15 wt/wt %.

5. The liquid dairy based creamer of claim 1, wherein the liquid dairy based creamer further comprises guar gum in an amount ranging from 0 to 0.25 wt/wt %.

6. The liquid dairy based creamer of claim 1, wherein the added sugar is selected from the group consisting of cane sugar, beet sugar, molasses, honey, monk fruit extract, stevia, rebaudiosides and combinations thereof.

7. The liquid dairy based creamer of claim 1 further comprising flavors selected from the group consisting of cocoa, Belgian chocolate, dark chocolate, vanilla, salt, caramel and combinations thereof.

8. The liquid dairy based creamer of claim 1, wherein the liquid dairy based creamer is free of artificial stabilizers, chemically modified stabilizers, emulsifiers, buffers, whitening agents, anti-foaming agents, chelators, or surfactants.

9. The liquid dairy based creamer of claim 1, wherein the total protein content is about 4 wt/wt %.

10. The liquid dairy based creamer of claim 1, wherein the total protein content is about 4.5 wt/wt %.

11. The liquid dairy based creamer of claim 1, wherein the total fat content is about 14 wt/wt %.

12. The liquid dairy based creamer of claim 1, wherein the total fat content is about 15 wt/wt %.

* * * * *